US011731610B2

United States Patent
Adrian et al.

(10) Patent No.: US 11,731,610 B2
(45) Date of Patent: Aug. 22, 2023

(54) ACCELERATION METHOD FOR A HYBRID DRIVETRAIN

(71) Applicant: Schaeffler Technologies AG & Co. KG, Herzogenaurach (DE)

(72) Inventors: Marcel Adrian, Kehl (DE); Yunfan Wei, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/632,524

(22) PCT Filed: Jul. 22, 2020

(86) PCT No.: PCT/DE2020/100643
§ 371 (c)(1),
(2) Date: Feb. 3, 2022

(87) PCT Pub. No.: WO2021/027990
PCT Pub. Date: Feb. 18, 2021

(65) Prior Publication Data
US 2022/0289171 A1    Sep. 15, 2022

(30) Foreign Application Priority Data

Aug. 15, 2019  (DE) .................... 10 2019 121 966.3
Sep. 26, 2019  (DE) .................... 10 2019 125 954.1

(51) Int. Cl.
*B60W 10/107*  (2012.01)
*B60W 20/19*   (2016.01)
(Continued)

(52) U.S. Cl.
CPC ............ *B60W 20/19* (2016.01); *B60K 6/543* (2013.01); *B60W 10/023* (2013.01);
(Continued)

(58) Field of Classification Search
CPC ..... B60W 2030/203; B60W 2030/206; B60W 20/19; B60W 10/023; B60W 10/06;
(Continued)

(56) References Cited

U.S. PATENT DOCUMENTS 6,083,138 A      7/2000  Aoyama et al.
2008/0132378 A1* 6/2008  Bouchon ............... B60W 10/10
                                                              477/79
(Continued)

FOREIGN PATENT DOCUMENTS

CN     108482362 A     9/2018
DE     102009054752 A1 6/2011
(Continued)

*Primary Examiner* — Roger L Pang

(57) ABSTRACT

An acceleration method for a hybrid drivetrain includes providing the hybrid drivetrain, setting an initial torque transmission ratio of a belt-drive transmission to a lower transmission ratio, and opening a first disconnect clutch to interrupt torque transmission between an internal combustion engine and an electric machine. The method also includes receiving an acceleration command, shifting the torque transmission ratio with a transmission adjustment gradient from the lower transmission ratio towards an upper transmission ratio, increasing a rotor speed of a rotor shaft of the electric machine with a rotor shaft adjustment gradient, and engaging a first disconnect clutch to rotate an ICE shaft to start the internal combustion engine and increase a rotational speed of the ICE shaft towards a current rotor speed.

15 Claims, 3 Drawing Sheets

(51) Int. Cl.
*B60K 6/543* (2007.10)
*B60W 10/02* (2006.01)
*B60W 10/06* (2006.01)
*B60W 10/08* (2006.01)
*B60W 20/30* (2016.01)
*B60W 20/40* (2016.01)
*F02N 11/08* (2006.01)
*F16H 61/30* (2006.01)
*F16H 61/662* (2006.01)
*B60K 6/26* (2007.10)

(52) U.S. Cl.
CPC ............ *B60W 10/06* (2013.01); *B60W 10/08* (2013.01); *B60W 10/107* (2013.01); *B60W 20/30* (2013.01); *B60W 20/40* (2013.01); *F02N 11/0851* (2013.01); *F02N 11/0859* (2013.01); *F16H 61/30* (2013.01); *F16H 61/662* (2013.01); *B60K 2006/268* (2013.01); *B60W 2540/10* (2013.01); *B60W 2710/021* (2013.01); *B60W 2710/06* (2013.01); *B60W 2710/081* (2013.01); *B60W 2710/083* (2013.01); *B60W 2710/1005* (2013.01); *B60W 2710/1083* (2013.01); *B60W 2720/106* (2013.01); *B60Y 2200/92* (2013.01)

(58) Field of Classification Search
CPC .... B60W 10/08; B60W 10/107; B60W 20/30; B60W 20/40; B60W 2540/10; B60W 2540/271; B60W 2540/021; B60W 2540/06; B60W 2710/081; B60W 2710/083; B60W 2710/1005; B60W 2710/1083; B60W 2720/106; B60W 10/02; B60K 6/543; B60K 2006/268; F16H 61/662
USPC .................................................. 477/5, 44–46
See application file for complete search history.

(56) References Cited

U.S. PATENT DOCUMENTS

| | | | |
|---|---|---|---|
| 2011/0021312 A1* | 1/2011 | Fukitani | F02D 41/0215 |
| | | | 180/65.265 |
| 2012/0116624 A1 | 5/2012 | Reith | |
| 2015/0239452 A1 | 8/2015 | Iwasa | |
| 2016/0137188 A1 | 5/2016 | Zhu et al. | |
| 2017/0066437 A1* | 3/2017 | Yamamoto | B60T 1/10 |
| 2017/0282900 A1* | 10/2017 | Suzuki | B60W 10/08 |
| 2019/0168743 A1* | 6/2019 | Friedrich | B60W 10/02 |

FOREIGN PATENT DOCUMENTS

| | | |
|---|---|---|
| DE | 102011015268 A1 | 10/2011 |
| DE | 102016222936 A1 | 5/2018 |
| DE | 102017112399 A1 | 12/2018 |
| DE | 102018107570 A1 | 10/2019 |
| DE | 102019109863 A1 | 9/2020 |

* cited by examiner

ACCELERATION METHOD FOR A HYBRID DRIVETRAIN

CROSS-REFERENCE TO RELATED APPLICATIONS

This application is the United States National Phase of PCT Appln. No. PCT/DE2020/100643 filed Jul. 22, 2020, which claims priority to German Application Nos. DE102019121966.3 filed Aug. 15, 2019 and DE102019125954.1 filed Sep. 26, 2019, the entire disclosures of which are incorporated by reference herein.

TECHNICAL FIELD

The present disclosure relates to an acceleration method for a hybrid drivetrain. The disclosure also relates to a hybrid drivetrain, e.g., for a motor vehicle, and a motor vehicle having such a hybrid drivetrain.

BACKGROUND

Example P2 hybrid vehicles from the B segment or C segment, for example dedicated hybrid CVTs, or DH-CVTs for short, are described in DE 10 2016 222 936 A1 and DE 10 2011 015 268 A1, for example. With hybrid drivetrains, a high acceleration ability, for example in a motor vehicle, more specifically a hybrid vehicle, is an important requirement in the specification. An operating situation of a hybrid drivetrain is, for example, a relatively constant speed and low torque output (partial load operation or overrun operation), for example when a hybrid vehicle is driving constantly, with maximum acceleration from this operating situation.

In a motor vehicle, this (sudden) acceleration request, which occurs, for example, in the acceleration lane of a motorway on-ramp, is referred to as a tip-in driving situation because of the gas pedal usually used as an input device for an acceleration command, since the gas pedal is fully depressed for this purpose. For example, in such an operating situation or driving situation, the motor vehicle moves at a speed of 50 km/h [fifty kilometers per hour] and should now be accelerated quickly to motorway speed, for example 130 km/h or faster. In a hybrid vehicle with a parallel hybrid arrangement, where both an electric machine and an internal combustion engine are configured as a torque source for outputting torque to the drive wheels, a large number of parameters are available due to the plurality of torque sources to enable such an acceleration to be executed.

Some hybrid drivetrains are provided with a variable ratio belt-drive transmission, also called a continuously variable transmission (CVT). A belt-drive transmission includes two pairs of conical pulleys with conical disks that can be axially displaced with respect to one another, and a belt that connects the two pairs of conical disks in a torque-transmitting manner. As a result of the relative axial movement of the two conical pulleys of a conical pulley pair, different active circles for the belt can be set on the conical pulley pairs, and thus the transmission can be varied, preferably continuously. As a result of an acceleration command, the gear ratio of the belt-drive transmission is set on the basis of various parameters such as efficiency, NVH (noise vibration harshness, also simply referred to as noise emissions) and acceleration reserve. In terms of efficiency, it is desirable to minimize the total drivetrain losses, which include losses of the individual components. These include the belt-drive transmission, the transmission actuator, the internal combustion engine, the electric machine and associated power electronics, the differential and the bearings, for example.

Conventionally, the internal combustion engine is started as a result of a (sudden) acceleration command so that both the internal combustion engine and the electric machine contribute to the acceleration. Likewise, the torque transmission ratio of the belt-drive transmission is adjusted to a ratio greater than 1, also called underdrive, in order to increase the wheel torque on the drive wheels in a hybrid vehicle, for example. A superimposition of the adjustment of the torque transmission ratio and a start of the internal combustion engine, however, requires a high hydraulic power consumption of the transmission actuator; because the transmission actuator must, among other things:

engage a (hydraulically operated) first disconnect clutch between the internal combustion engine and the electric machine (also known as a K0 clutch) so that the electric machine can tow the internal combustion engine;

adjust the torque transmission ratio of the belt-drive transmission, because the contact pressures in the pressure chambers of the first pair of conical pulleys and the second pair of conical pulleys have to be changed, and a briefly high oil volume inflow (i.e., under pressure build-up or pressure constancy) must be provided in one of the two pressure chambers due to the adjustment of the torque transmission ratio;

ensure the contact pressures in the conical pulley pairs against the drive belt to avoid slipping and thus damage to the drive belt; and supply the transmission components, such as the disconnect clutch(s) and belt-drive transmission, with an oil flow for a possibly increased cooling requirement.

SUMMARY

The present disclosure relates to an acceleration method for a hybrid drivetrain, where the hybrid drivetrain includes:

a belt-drive transmission having a transmission input shaft and a transmission output shaft, wherein it is possible to transmit a torque between the transmission input shaft and the transmission output shaft by means of the belt-drive transmission, wherein a torque transmission ratio can be varied between a lower transmission ratio and an upper transmission ratio, wherein in the upper transmission ratio the torque transmission ratio is greater than in the lower transmission ratio;

an internal combustion engine having an ICE shaft for outputting a torque to the transmission input shaft;

an electric machine having a rotor shaft for outputting a torque to the transmission input shaft; and a first disconnect clutch between the electric machine and the internal combustion engine. The acceleration method includes the following steps in the following order:

a. receiving an acceleration command while a medium torque request is present at the transmission output shaft and the lower transmission ratio is set on the belt-drive transmission, and torque transmission between the internal combustion engine and the electric machine is interrupted by the first disconnect clutch;

b. shifting the lower transmission ratio with an adjustment gradient towards the upper transmission ratio and increasing the rotor speed of the rotor shaft; and c. after the start of step b., engaging the first disconnect clutch to start the ICE shaft and increasing the rotational speed of the ICE shaft towards the current rotor speed.

Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

The acceleration method proposed here enables an acceleration of a, for example conventional, hybrid drivetrain, for example of category P2 or P2/P3, in each of which there is a disconnect clutch between the internal combustion engine and the electric machine, which is configured to start the internal combustion engine, without excessive power consumption of the transmission actuator. For example, the hybrid drivetrain is a mobile application, and a drive wheel can be supplied with a torque and for drives the hybrid drivetrain. In response to an acceleration command, the drive wheel is to be operated at an accelerated speed and, for this purpose, at least the inertia of the hybrid drivetrain, for example of a hybrid vehicle, must be overcome, i.e., a torque must be increased. A sudden acceleration as a result of a sudden acceleration command may be described below.

The hybrid drivetrain configured here for carrying out the acceleration method has an internal combustion engine and an electric machine, as described at the outset. The electric machine is configured for starting the internal combustion engine. Between a consumer, for example, a drive wheel of a hybrid vehicle, and the internal combustion engine and the electric machine, a belt-drive transmission is interposed for a variable transmission between the drive machines and the consumer. The torque transmission ratio of the belt-drive transmission can be changed between a minimum transmission ratio and a maximum transmission ratio. The lower transmission ratio is in the (lower) half, which is limited by the minimum transmission ratio, or the minimum transmission ratio and the upper transmission ratio is in the (upper) half, which is limited upwards by the maximum translation status, or is the maximum translation status. In a symmetrically designed belt-drive transmission, for example, the minimum transmission ratio has a torque transmission ratio of 0.5 [half] and the maximum transmission ratio has a torque transmission ratio of 2 [two]. The lower transmission ratio is then less than 1, for example 0.5, and the upper transmission ratio is greater than 1, for example 2. In the case of an asymmetrically designed belt-drive transmission, by means of which a gear ratio is set, for example by means of cone pulley pairs of different sizes, the mean gear ratio between the two halves is not equal to 1, for example 2, and, for example, the minimum transmission ratio is 1 and the maximum transmission ratio is 4.

It is now proposed that from an operating state in which there is a medium torque request on the transmission output shaft (and a corresponding torque provision on the transmission input shaft, for example) and the lower transmission ratio is set on the belt-drive transmission, for example (depending on the motor vehicle vocabulary), partial load operation or overrun operation is present. In step a., an acceleration command is received, and the first disconnect clutch is disengaged, so that torque transmission between the internal combustion engine and the transmission input shaft is interrupted. The internal combustion engine may be switched off, for example the ICE shaft is at a standstill or it rotates due to inertia.

Instead of now closing the first disconnect clutch in order to tow the internal combustion engine, i.e., to bring it up to operating speed, in step b., first, the torque transmission ratio is shifted from the lower transmission ratio towards the upper transmission ratio and the rotor speed of the rotor shaft of the at least one electric drive machine is increased. In one embodiment, the torque transmission ratio remains in the lower half. The hybrid drivetrain comes from a low load state, and the torque of the electric machine increases. The requested output of the transmission actuator, starting from a low level analogous to the load, increases moderately because only an adjustment pressure on the belt-drive transmission and, under certain circumstances, an increased cooling output must be maintained. The rotational speed of the rotor shaft of the electrical drive machine and of the transmission input shaft, starting from a rotational speed of here, for example, 1600 rpm, which is typical for motor vehicles in the partial load range or overrun, increase. The torque transmission ratio changes as a result of the adjustment gradient in the direction of the upper half (for example underdrive).

Only then, in step c., the first disconnect clutch for towing the internal combustion engine is engaged or slipped by means of the electric machine. As soon as the operating speed of the ICE shaft is reached, i.e., the combustion engine is running independently, the combustion engine speed is increased, e.g., to the rotor speed.

For low power consumption as a result of the acceleration command, in step b., the torque transmission ratio may be shifted towards the upper transmission ratio state and the rotor speed of the rotor shaft is high before the first disconnect clutch is engaged.

For example, the entire acceleration method takes 1.3 seconds [thirteen tenths of a second]. Step b. takes 0.7 seconds, for example, and step c. takes 0.6 seconds, for example. At a starting speed of 50 km/h (fifty kilometers per hour) before receiving the acceleration command in step a., a speed of 55 km/h or more is reached after 1.3 seconds, for example. The acceleration of the hybrid drivetrain is not (inevitably) ended with the acceleration process, but can be continued from now on with the assistance of the internal combustion engine. The acceleration command from step a., which via steps b. and c. is still obtained, is input, for example, from a so-called gas pedal, a hand throttle or a joystick. For example, a predetermined angular position (for example of the gas pedal) can be reached in order to trigger the acceleration method, while acceleration can be achieved with an angular position below the predetermined angular position, but acceleration is slower than with the acceleration method proposed here.

It is also proposed in an example embodiment of the acceleration method that a second disconnect clutch is provided between the electric machine and the belt-drive transmission, and the second disconnect clutch is actuated in accordance with the torque.

In this embodiment, a second disconnect clutch is arranged in such a way that both the electric machine and the internal combustion engine can be disconnected from the belt-drive transmission and thus from a consumer. This second disconnect clutch is also called a K2 clutch. The second disconnect clutch can (optionally) be actuated to match the torque and is therefore only pressed as much as is necessary to transmit an applied engine torque. In this way, energy and, with hydraulic actuation, hydraulic power can be saved. The disconnect clutch is therefore, for example, a friction clutch or a so-called wedge clutch. A wedge clutch has a hub cone and a (rounded) polygonal driver cone with a corresponding receiving cone designed as a solid spring, for example. With such a wedge clutch, it is possible to switch between relative speeds of 20 rpm [twenty revolutions per minute] to 30 rpm, because the engagement is not purely form-fitting, but rather force-fitting. In one embodiment, the second disconnect clutch is kept in a slipping state referred to as continuous slip, for example allowing a small speed difference, e.g., for damping vibrational excitations.

It is also proposed in an example embodiment of the acceleration method that the hybrid drivetrain has an adaptive system pressure source and at least the belt-drive transmission and the first disconnect clutch are hydraulically fed from the system pressure source. A hydraulic system power sensed by the hybrid drivetrain as a product of the respective current system pressure and the respective current hydraulic volume flow of the system pressure source is kept below a predetermined maximum power limit value.

In this embodiment, at least part of the, e.g., the entire, transmission actuator system is actuated hydraulically. Here it is also proposed (optionally) that the system pressure source is also adaptive. A needs-based system pressure can therefore be maintained and/or a needs-based hydraulic volume flow can be provided. If, for example, no hydraulic power is requested, no or only a minimal system pressure is held by the system pressure source. Often the hybrid drivetrain is in operation permanently to generate at least one cooling flow. Such a cooling flow is either generated via another pressure source or a minimum supply pressure enables the minimum required volume flow for the required (for example minimal) cooling. This means that energy can be saved.

The system pressure source is, for example, an electrically operated pump. Alternatively or additionally, a mechanical pump is provided that is adaptive (for example by means of valves) or can be added for adaptability of the system pressure source (to an electrically operated pump). A switchable mechanical pump can be driven by means of the ICE shaft, and, for example, connected to the ICE shaft in an inseparable torque-transmitting manner.

It is now proposed here that a maximum power limit value is established (i.e., predetermined) that limits the maximum system pressure (with a current hydraulic volume flow) and the maximum hydraulic volume flow (with a current system pressure) or the product of the current system pressure and the current hydraulic volume flow. While the hydraulic power is disregarded in previously known embodiments of an acceleration method, the hydraulic power is considered here. It should be pointed out, however, that previously known or other parameters (for example efficiency, noise emissions and acceleration reserve, state of charge of a battery) can also be taken into account in the embodiment of the acceleration method. The predetermined maximum power limit value depends on battery capacities, installation space for a system pressure source, costs and/or a desired performance of the hybrid drivetrain or other limiting conditions.

With this acceleration method, the hydraulic power is monitored or the system pressure and the hydraulic volume flow. The method steps may be carried out one after the other in time in such a way that the predetermined maximum power limit value is never reached. As a result of the delay in starting the internal combustion engine proposed here, the maximum power limit value can be reduced compared to a conventional acceleration method in which the internal combustion engine is started upon receiving a (e.g., sudden) acceleration command. In addition, the increasing torque of the electric machine, which is configured to start the internal combustion engine, is in an increasing rotor speed and/or can be converted into an acceleration for the consumer.

In a conventional acceleration method, however, at least part of the torque of the rotor shaft is diverted to start the internal combustion engine and is therefore not converted directly into an acceleration. A high acceleration can therefore be provided despite the delay in starting the internal combustion engine. The only prerequisite is that the electric machine in the present operating situation in step a. has a torque reserve, and preferably a speed reserve. This is usually the case in partial load operation or overrun operation, as well as when a (sudden) acceleration command (tip-in) rapid acceleration is expected from the user, for example a driver of a hybrid vehicle. For example, when approaching the maximum speed of the hybrid vehicle, this is not expected.

It is also proposed in an example embodiment of the acceleration method that step b. is carried out until the predetermined maximum power limit value is reached by the hydraulic system power and only then is step c. carried out.

In this embodiment of the acceleration method, the maximum hydraulic power is exhausted when an (e.g., sudden) acceleration command is present. For example, in step b., the torque transmission ratio is increased with a high adjustment gradient until the predetermined maximum power limit value is reached. Furthermore, for example, the adjustment gradient on the belt-drive transmission is (only) then reduced in order to remain at or below the maximum power limit value. The adjustment gradient is (only) increased again when the hydraulic volume flow for adjusting the torque transmission ratio on the belt-drive transmission drops, for example in the upper half (e.g., underdrive), and, for example, (only) when the first disconnect clutch is engaged to tow the ICE shaft or is put in slip.

It is also proposed in an example embodiment of the acceleration method that step b. is divided into a sub-step b.1 and a sub-step b.2 carried out thereafter, and the adjustment gradient is carried out in:

sub-step b.1 for high hydraulic volume flow; and
sub-step b.2 with increased torque output from the electric machine for an increasing torque-adequate system pressure.

In this embodiment of the acceleration method, step b. is divided into an initial hydraulic volume flow that is large or into an increase in the hydraulic volume flow in sub-step b.1 that is fast, as a result of which a high adjustment gradient or a rapid increase in the adjustment gradient is achieved while the (necessary) system pressure is still low. The (required) system pressure is initially still low because the electric machine does not yet deliver a greatly increased torque due to inertia or due to a power limitation. Only when the torque of the rotor shaft has increased, the hydraulic volume flow or the increase in the hydraulic volume flow is reduced again. Then, in step b.2, the system pressure is increased with the increasing torque of the rotor shaft. The hydraulic system power may be kept close to the previously described maximum output limit value.

It is further proposed in an example embodiment of the acceleration method that, during step c., an intermediate transmission ratio reached after step b. is shifted further in the direction of the upper transmission ratio and the rotor speed of the rotor shaft is increased further, and the adjustment gradient and/or the change in the adjustment gradient is decreased compared to step b.

In this embodiment, after step b., the torque transmission ratio is further increased in step c., e.g., until the maximum torque transmission ratio is reached, for example a torque transmission ratio of 2. The adjustment gradient of the belt-drive transmission or the change in the adjustment gradient is reduced, however, compared to the adjustment gradient or its change in step b., e.g., increased compared to the time average of the adjustment gradient or its change in sub-steps b.1 and b.2 according to the previous description and increased compared to the adjustment gradient or its change in sub-step b.2. In one embodiment, the adjustment gradient in step c. is first raised quickly until the first disconnect clutch is pressed so that the ICE shaft can be started, and then only raised slowly. In this embodiment, the mean value over time of the adjustment gradient or its change in comparison to the adjustment gradient in step b. is decreased.

It is also proposed in an example embodiment of the acceleration method that the hydraulic system power in step b. is provided solely by a first pump with an electric drive unit and, in step c., a second pump driven by the internal combustion engine also contributes to the hydraulic system power when the ICE shaft is started.

In this embodiment, a first pump and a second pump are provided, which contribute to generating a system pressure and hydraulic volume flow connected in series or in parallel. The first pump has an electric drive unit and is therefore an electric pump. This first pump is fed from an electrical energy source, for example a battery. The second pump is mechanical and is driven by the internal combustion engine, i.e., at least indirectly by the ICE shaft. In one embodiment, the second pump is continuously in operation, at least when the first disconnect clutch (K0 clutch) is engaged, for example (bridging the first and second disconnect clutch) when the ICE shaft rotates. The second pump thus relieves the load on the first pump and the electrical energy source. In one embodiment, the first pump is switched off when the second pump has started operation, e.g., only when a torque reserve is held by the internal combustion engine. I.e., if the maximum acceleration is to be achieved, the first pump continues to operate so that the torque of the ICE shaft is available to the consumer.

It is further proposed in an example embodiment of the acceleration method that, if the acceleration command is aborted, the acceleration method is aborted, and the intermediate transmission ratio may be shifted back towards the lower transmission ratio. In the event of an aborting during the towing of the ICE shaft, the first disconnect clutch may be engaged and the rotational energy of the ICE shaft may be passed on to the drive-belt transmission and/or is recuperated.

In this embodiment, after an acceleration command received in a step a. and at any time until the end of step c., the acceleration method is aborted. This means that, for example, the adjustment gradient, i.e., the change in the torque transmission ratio, is no longer kept constant or is no longer increased. This also means that the first disconnect clutch is disengaged again, even if or precisely if the internal combustion engine has not yet been brought up to its operating speed. A method that, for example, taking conventional parameters into account, returns to partial load or overrun mode, i.e., for example, the torque transmission ratio in the direction of the lower half (for example overdrive), may take over and set the minimum transmission ratio. For example, a driver wants to accelerate the hybrid vehicle quickly and depresses the gas pedal, but the traffic situation does not allow the desired speed and the driver takes their foot off the gas pedal again.

In an operating situation in which the ICE shaft has already been started to a sufficiently high combustion engine speed, e.g., below the operating speed of the combustion engine, the first disconnect clutch is engaged despite the stoppage, so as to utilize the introduced rotational energy of the combustion shaft by:

i. connecting the ICE shaft to the transmission input shaft of the belt-drive transmission; and/or ii. converting the rotational energy into electrical energy by the electric drive machine or another (motor) generator in generator mode.

In alternative i., rotational irregularities of the combustion engine speed are compensated, for example, by means of a corresponding control of the rotor shaft of the electric machine. In alternative ii., the second disconnect clutch may be disengaged. In one embodiment, both alternatives are executed at the same time, i.e., the second disconnect clutch (optionally available in the hybrid drivetrain) is not disengaged while the rotational energy of the ICE shaft is being recuperated. Which of the alternatives, i. and/or ii., is carried out, for example, is based on the state of charge of the battery (range extenders mode) and decided based on the requested torque.

In one embodiment according to the present disclosure, the acceleration method is contained and executable in an on-board computer of a hybrid vehicle. The on-board computer is configured to process measurement data from the hybrid drivetrain and/or hybrid vehicle's measurement sensors in such a way that it can be processed in an internal processor so that the acceleration method can be carried out.

An on-board computer organizes the recorded data and/or performs calculations relating to the preparation for an integrated or external user interface. With regard to the execution or triggering of the acceleration method, reference is made to the preceding description and the variants shown there.

In one embodiment according to the present disclosure, the acceleration method is executed in a computer program including computer program code or implemented as such or contained in a computer program product on which the computer program code is stored. The computer program code is executable on a computer such that the computer is caused to execute said acceleration method, and the computer is integrated, for example, in a hybrid drivetrain and/or hybrid vehicle.

The computer-implemented acceleration method is realized, for example, by a computer program that includes computer program code that, when it is executed on a computer, causes the computer to perform the acceleration method according to the disclosure. Computer program code is synonymous with one or more instructions or commands that cause a computer or processor to carry out a series of operations that represent, for example, an algorithm and/or other processing methods. The computer program can be executed, for example, on an on-board computer of a hybrid vehicle.

A computer program product, including computer program code, for example, is a medium such as RAM, ROM, an SD card, a memory card, a flash memory card, or a disc, or is stored on a server and is downloadable. If the computer program is made readable via a read unit, for example a drive and/or an installation, the computer program code and the method contained therein can be executed by a computer or in communication with a plurality of processing units, for example as described above.

According to a further aspect, a drivetrain is proposed, having at least the following components:

a belt-drive transmission having a transmission input shaft and a transmission output shaft, wherein it is possible to transmit a torque between the transmission input shaft and the transmission output shaft by means of the belt-drive transmission;

an internal combustion engine having an ICE shaft for outputting a torque to the transmission input shaft;

an electric machine having a rotor shaft for outputting a torque to the transmission input shaft; and a first disconnect clutch between the electric machine and the internal combustion engine. The hybrid drivetrain is configured to carry out the acceleration method according to an embodiment according to the above description, and a second disconnect clutch may be provided between the electric machine and the belt-drive transmission.

The hybrid drivetrain proposed here has already been described in connection with the description of the acceleration method. In this respect, reference is made to the above description. The following method features are also (at least optional) features of the acceleration method.

Conventional measuring electronics and/or control electronics may be used to carry out the acceleration method. This is only changed in terms of software, for example. In one embodiment, the acceleration method proposed herein is incorporated into a selection program for operating the hybrid drivetrain for a user, such as in an eco mode, or different maximum power limits are set for different selection programs for operating the hybrid drivetrain. The hybrid drivetrain proposed here is therefore efficient and can be operated with little or no loss of acceleration behavior.

According to a further aspect, a hybrid vehicle is proposed, having at least one drive wheel and a hybrid drivetrain for driving the hybrid vehicle by means of the at least one drive wheel, and a third disconnect clutch may be provided between the transmission output shaft of the belt-drive transmission and the at least one drive wheel. The second disconnect clutch may include a first partial clutch and a second partial clutch, wherein:

a torque transmission between the electric machine and the transmission input shaft of the belt-drive transmission can be disconnected by means of the first partial clutch; and a direct torque transmission between the electric machine and the at least one drive wheel can be disconnected by means of the second partial clutch.

The hybrid vehicle proposed here can be accelerated by means of the hybrid drivetrain, and the at least one drive wheel thus represents the (main) consumer of the hybrid drivetrain. The hybrid vehicle proposed here has already been described in connection with the description of the acceleration method. In this respect, reference is made to the above description. The following method features are also (at least optional) features of the acceleration method.

In an example embodiment, a third disconnect clutch is provided, by means of which the hybrid drivetrain can be disconnected from the at least one drive wheel. The third disconnect clutch is, for example, a form-fit disconnect clutch, for example a claw clutch or a wedge clutch.

In one embodiment, the second disconnect clutch includes a first partial clutch and a second partial clutch, so that the hybrid drivetrain can be switched from a hybrid of the P2 category (first partial clutch engaged and second partial clutch disengaged) to a hybrid of the P3 category (reversed first partial clutch disengaged and second partial clutch engaged). For this purpose, the second partial clutch is followed by a parallel direct transmission, so the belt-drive transmission is bridged. The electric machine, and, for example, also the internal combustion engine, is therefore connected directly to the at least one drive wheel in a torque-transmitting manner by means of the second partial clutch. In an example embodiment, at least one of the partial clutches is a wedge clutch, e.g., both, as a double wedge clutch, for example, with a common central receiving cone as the output side. In one embodiment, the first partial clutch and the second partial clutch can be operated engaged at the same time. The parallel partial powertrains can be operated in parallel without tension and/or a third disconnect clutch is interposed between the second disconnect clutch or the first partial clutch and the at least one drive wheel, which then (for example in an otherwise tense state of the parallel partial powertrains) is disengaged. The third disconnect clutch may be arranged between the transmission output shaft and the consumer connection to the at least one drive wheel, and the parallel partial gear train is connected to the at least one drive wheel via the second partial coupling by means of the same consumer connection.

BRIEF DESCRIPTION OF THE DRAWINGS

The present disclosure is explained in detail below based on the technical background with reference to the associated drawings, which show example embodiments. The disclosure is in no way restricted by the purely schematic drawings, and it should be noted that the drawings are not dimensionally accurate and are not suitable for defining proportions. In the figures.

DETAILED DESCRIPTION

Figure 1:
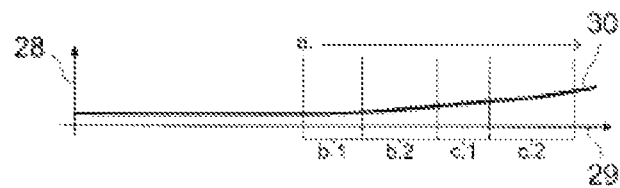
FIG. 1 shows a speed diagram.
Figure 7:
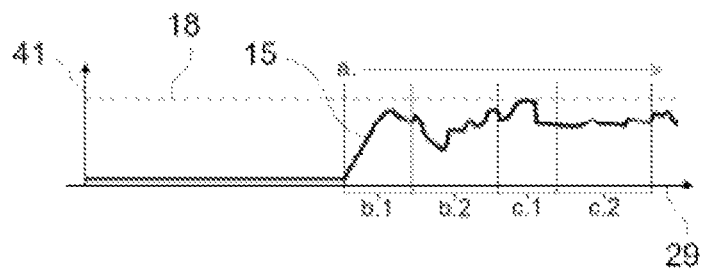
FIG. 7 shows a hydraulic performance diagram.
Figure 8:
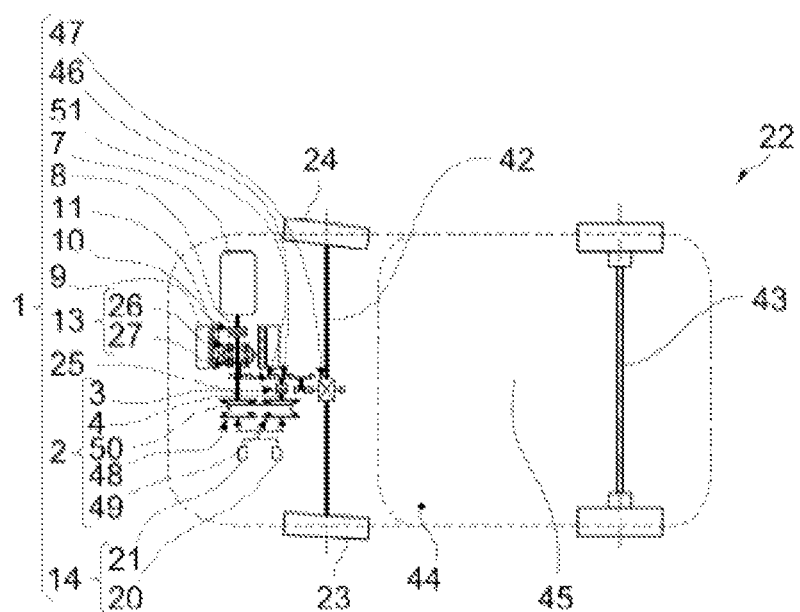
FIG. 8 shows a hybrid drivetrain of the P2/P3 category in a hybrid vehicle.

FIG. 1 shows a speed diagram with a speed axis 28 as the y axis and a time axis 29 as the x axis, for example of a hybrid vehicle 22 as in FIG. 8, which is referred to here without limitation of generality for the explanation of the participating components of the hybrid drivetrain 1. The letters represent steps a. to c. or sub-steps thereof. This also applies in the following to FIGS. 2 to 7. With the speed profile 30 shown, for example, in the operating state before the acceleration command has been received (in step a.), there is a constant speed, for example approximately 50 km/h. This represents a partial load operation or overrun operation. At a point in time 0, here at the vertical line below the letter a., an acceleration command is output (step a.), for example by means of a tip-in a gas pedal in a hybrid vehicle 22. Thereupon in step b., here (optionally) comprising the sub-steps b.1 and b.2, the speed of the rotor shaft 10 (see rotor speed curve 37 in FIG. 4) is increased and the torque transmission ratio is raised from a lower transmission ratio 5 to the upper half (see FIG. 2). This is followed by an acceleration of the hybrid vehicle 22, which is brought about purely by the electric machine 9. This continues in step c., here (optionally) comprising sub-steps c.1 and c.2, wherein the internal combustion engine 7 is started in parallel here (see combustion engine speed curve 38 in FIG. 4). It should be noted that the acceleration command from step a. via steps b. and c. is maintained, for example by holding down a gas pedal. This is indicated by the arrow pointing to the right. The acceleration is also continued, for example, according to this acceleration method, wherein the internal combustion engine 7 then takes over or assists the electric machine 9. The acceleration method is aborted, for example, when the acceleration command is canceled, i.e., for example, the gas pedal is no longer depressed or is depressed too little. For example, the entire acceleration method takes 1.3 seconds [thirteen tenths of a second]. Sub-step b.1 takes, for example, 0.2 seconds, sub-step b.2 takes, for example, 0.5 seconds, sub-step c.1 takes, for example, 0.1 seconds, and sub-step c.2 takes, for example, 0.5 seconds.

Figure 2:
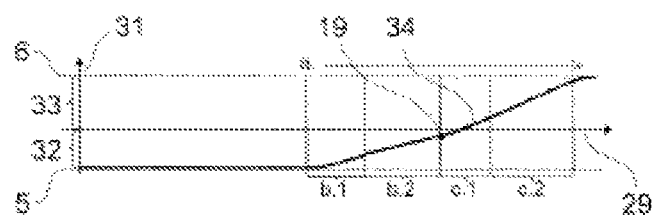
FIG. 2 shows a torque transmission diagram.

FIG. 2 shows a torque transmission diagram of a belt-drive transmission 2, which relates to the speed diagram in FIG. 1 and the associated description. The y axis is the transmission ratio axis 31 and the x axis is again the time axis 29. Below the time axis 29 the lower half 32 is shown, and above the time axis 29 the upper half 33 of the (e.g., entire) adjustable torque transmission ratio of the belt-drive transmission 2 is shown. In the example shown, the lower transmission ratio 5 set in the initial operating state (before time 0) is the minimum transmission ratio of the belt-drive transmission 2, for example. Regardless of this, in the example shown, the upper transmission ratio 6 set in the final operating state (after step c.) is the maximum transmission ratio, e.g., of the belt-drive transmission 2. In this example, the gear ratio curve 34 runs almost continuously increasing from the start of sub-step b.1 to the end of sub-step c.2 from the lower transmission ratio 5 to the upper transmission ratio 6 (and here optionally increased even further after the acceleration method). Between the sub-steps b.1 and b.2, (any) one intermediate transmission ratio 19 is identified, which is in the lower half. In the case of a symmetrical belt-drive transmission 2, the lower half 32 is to be referred to as overdrive and the upper half 33 as underdrive, wherein a torque is reduced in overdrive, i.e., the torque transmission ratio is less than 1 and a torque is transmitted in underdrive, i.e., the torque transmission ratio is greater than 1. For example, the minimum transmission ratio 5 is 0.5 [half] and the maximum transmission ratio 6 is 2 [two].

Figure 3:
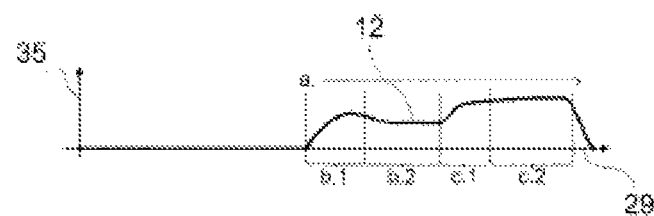
FIG. 3 shows an adjustment gradient diagram.

FIG. 3 shows an adjustment gradient diagram of a torque transmission ratio of a belt-drive transmission 2, which relates to the speed diagram in FIG. 1 and the torque transmission diagram in FIG. 2, as well as the associated description. The speed of the change in the gear ratio of the belt-drive transmission 2 is thus shown. The y axis is accordingly the adjustment gradient axis 35 (speed of the change in the transmission ratio) and the x axis is again the time axis 29, wherein the time axis 29 runs through the adjustment gradient 12 from zero here. After the initial operating state (before time 0), there is no change in the torque transmission ratio of the belt-drive transmission 2 in question and, from time 0, there is an exclusively positive change in the torque transmission ratio. This is particularly advantageous for rapid acceleration (with sufficient electrical torque reserve) but not a requirement for the acceleration method proposed here. First, the torque transmission ratio is quickly increased in a sub-step b.1 because here the system pressure 16 is still low (see FIG. 5) and thus, despite a high hydraulic volume flow 17 necessary for a rapid change of the torque transmission ratio (see FIG. 6), an acceptable or permissible system power 15 (see FIG. 7) can still be maintained below a predetermined maximum power limit value 18. In sub-step b.2, the change in the torque transmission ratio is now advanced further (see FIG. 2), but not with an increasing adjustment gradient 12, here, for example, with an adjustment gradient 12 greater than zero, which is constant after a short decrease.

Figure 4:
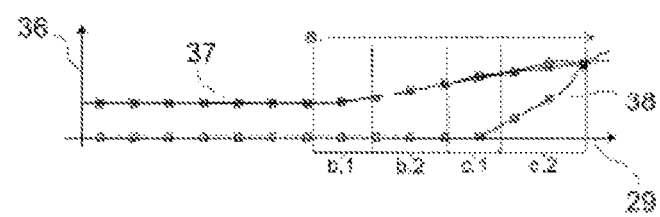
FIG. 4 shows a rotational speed diagram.
Figure 5:
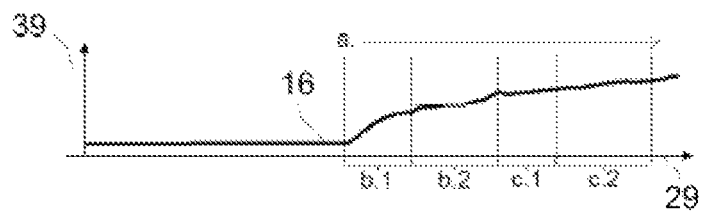
FIG. 5 shows a system pressure diagram.

In sub-step c.1, the adjustment gradient 12 (based on the marked intermediate transmission ratio 19 achieved, here optionally in the lower half 32) is increased quickly while the first disconnect clutch 11 is engaged (see FIGS. 4 and 6) and the system pressure 16 must be increased further (see FIG. 5). With the system pressure 16 now present after sub-step c.1, it is advantageous to reduce the change in the displacement gradient 12 again in step c.2, but, for example, to raise the displacement gradient 12 further for fast acceleration. The system power 15 remains below the maximum power limit value 18 (see FIG. 7). After step c., the upper, e.g., maximum, transmission ratio 6 is reached. According to technical and/or performance-related parameters, the adjustment gradient 12 is then brought back to zero. In one embodiment, the adjustment gradient 12 is briefly below zero, i.e., theoretically the change in the torque transmission ratio is reduced again, but this serves the purpose of a transfer to the upper transmission ratio 6 quickly and then an adaptation of the adjustment to continuous operation in this set transmission ratio 6, for which a lower contact pressure is necessary than to adjust the torque transmission ratio.

FIG. 4 shows a rotational speed diagram of an electric machine 9 and an internal combustion engine 7, which relates to the preceding diagrams in FIGS. 1 to 3 and the associated description. The y axis is the rotational speed axis 36 and the x axis is again the time axis 29, wherein the time axis 29 runs through the rotational speed of zero here. The initially upper curve represents the rotor speed curve 37, for example at the currently usual 1,600 rpm, and the initially lower curve shows the combustion engine speed curve 38. In step b., the rotor speed is increased in response to step a., and this continues in step c., and for example also thereafter if the acceleration command continues to be present. Only in sub-step c.1, the first disconnect clutch 11 is engaged and thus the internal combustion engine 7 is started by the electric machine 9 and brought to an operating speed, in this example at the start of step c.2. After step c.1, the first disconnect clutch is engaged for full torque transmission. It should be pointed out that the internal combustion engine 7 has already changed from a torque sink to a torque source from the start of sub-step c.2, i.e., when the operating speed is reached, currently usually 800 rpm. After step c. the hybrid vehicle 22 in question can be additionally or exclusively accelerated by means of the internal combustion engine 7. The sub-step c.1 is carried out at a point in time of the acceleration method, while the electric machine 9 has such a sufficient torque reserve that the electric machine 9 is able to accelerate the hybrid vehicle 22 in question and to start the internal combustion engine 7 at the same time. An additional (separate) starter is not necessary here.

FIG. 5 shows a system pressure diagram of a system pressure source 14 of a hybrid drivetrain 1, which relates to the preceding diagrams in FIGS. 1 to 4 and the associated description. The y axis is the system pressure axis 39 and the x axis is again the time axis 29. Initially, the system pressure 16 is at a low level, constant in this example. In steps b. and c., in response to the acceleration command of step a., the system pressure 16 is raised adaptively, i.e., adjusted to the current demand. The aim here is to continuously increase the system pressure 16, taking into account the efficiency and/or the performance.

Figure 6:
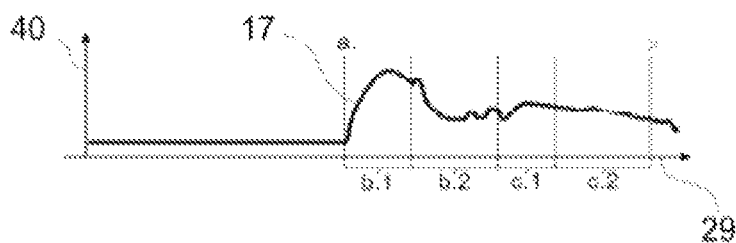
FIG. 6 shows a volume flow diagram.

FIG. 6 shows a volume flow diagram of a system pressure source 14 of a hybrid drivetrain 1 (see FIG. 8), which relates to the preceding diagrams in FIGS. 1 to 5 and the associated description. The y axis is the volume flow axis 40 and the x axis is again the time axis 29. Initially, the hydraulic volume flow 17 is at a low level, constant in this example. In step b.1, the acceleration command in step a. towards the hydraulic volume flow 17 is increased (e.g., quickly) until at least approximately the predetermined maximum power limit value 18 (see FIG. 7) is reached at the current system pressure 16 (see FIG. 5). For example, the power falls below the predetermined maximum power limit value 18, taking into account the maximum possible, maximum efficient and/or maximum noise emitting adjustment speed of the torque transmission ratio of the belt-drive transmission 2 in question. Subsequently, in sub-step b.2, the hydraulic volume flow 17 is reduced so that the predetermined maximum power limit value 18 is not exceeded until the end of sub-step b.2 despite the increasing system pressure 16 (see FIG. 5). During the transition to sub-step c.1, the hydraulic volume flow 17 is briefly and greatly reduced because an increased system pressure 16 is briefly necessary here to engage the first disconnect clutch 11 (see increase in FIG. 5). Subsequently, the hydraulic volume flow 17 is increased again and, taking into account further parameters, it is therefore reduced overall when the system pressure 16 rises below the predetermined maximum power limit value 18.

FIG. 7 shows a hydraulic performance diagram of a system pressure source 14 of a hybrid drivetrain 1 (see FIG. 8), which relates to the preceding diagrams in FIGS. 1 to 6 and the associated description and represents the product of the current system pressure 16 and the current hydraulic volume flow 17. This value is approximately proportional to an electrical power consumption, provided that or as long as the system pressure source 14 is provided solely by an electric pump 20 (from step c., the mechanical pump 21 may be added as a support). Alternatively, the system power 15 shown here is the total system power 15 without taking into account the provision, i.e., also including the power decrease at the ICE shaft 8. The y axis is the power axis 41 and the x axis is again the time axis 29. Initially, the system power 15 is at a low level, in this example constant. In step b.1, the acceleration command in step a. towards the system power 15 as a result of the increase in the hydraulic volume flow 17 and the system pressure 16 (see FIGS. 5 and 6), at least approximately the predetermined maximum power limit value 18 is reached. For example, such a maximum power limit value 18 corresponds to 400 W [four hundred watts]. Until the end of the acceleration method, and if the acceleration command persists, the system power 15 is kept engaged to the predetermined maximum output limit value 18. On the one hand, the hydraulic volume flow 17 and the system pressure 16 are coordinated with one another for fast acceleration, primarily a change in the torque transmission ratio on the belt-drive transmission 2 in question, and on the other hand, other parameters such as efficiency, noise emissions and acceleration reserve, for example in a conventional manner, are taken into account.

FIG. 8 shows a hybrid drivetrain 1 of the P2/P3 category in a hybrid vehicle 22 in an (optional) front-cross arrangement for driving by means of the front axle 42, optionally also or solely by means of the rear axle 43, via a left drive wheel 23 and a right drive wheel 24 shown in a schematic view from above. The hybrid drivetrain 1 is in front of the driver's cab 44 and the shafts of the components shown are arranged transversely to the longitudinal axis 45, i.e., parallel to the front axle 42 and rear axle 43. The hybrid drivetrain 1 shown includes as torque sources (e.g., also operable as torque sinks) an internal combustion engine 7 with an ICE shaft 8 and an electric machine 9 with a rotor shaft 10 (here the arrow points to the rotor for clarity). The internal combustion engine 7 and the electric drive machine 9 are connected by means of a belt-drive transmission 2 via a load connection 46 and a differential 47 to transmit torque to the drive wheels 23, 24. The belt-drive transmission 2 has a transmission input shaft 3 with an input-side conical pulley pair 48 and a transmission output shaft 4 with an output-side conical pulley pair 49, wherein the two conical pulley pairs 48, 49 are connected to one another in a torque-transmitting manner by means of a belt drive 50.

Here (optionally) a further partial powertrain 51 is provided in parallel, which is designed as a fixed spur gear and by means of which the internal combustion engine 7 and the electric machine 9 are also connected to the drive wheels 23, 24 via the consumer connection 46 and the differential 47 in a torque-transmitting manner. The connection is separable solely to the internal combustion engine 7 by means of a first disconnect clutch 11 (commonly referred to as a K0 clutch or K1 clutch). Furthermore, the connection to the internal combustion engine 7 and the electric machine 9 is made by means of a second disconnect clutch 13 (generally referred to as K2 clutch) is separable from the drive wheels 23, 24, or can be switched between a transmission by means of the belt-drive transmission 2 or by means of the parallel partial powertrain 51. The machines 7, 9 can be disconnected from the transmission input shaft 3 of the belt-drive transmission 2 by means of a first partial clutch 26 of the second disconnect clutch 13 and disconnected from the parallel partial powertrain 51 by means of a second partial clutch 27 of the second disconnect clutch 13.

Optionally, a third disconnect clutch 25 is also provided behind the transmission output shaft 4 of the belt-drive transmission 2, which is designed as a claw clutch, for example, so that the transmission output shaft 4 can be disconnected from the consumer connection 46. In a drive state of the hybrid vehicle 22 in which the parallel partial powertrain 51 is used, the belt-drive transmission 2 is not dragged along when the first partial clutch 26 of the second disconnect clutch 13 is disengaged and the third disconnect clutch 25 is disengaged. This increases the efficiency of this drive state. Furthermore, it is shown here that the belt-drive transmission 2 or the conical pulley pairs 48, 49 are supplied by a system pressure source 14, wherein an electric pump 20 and a mechanical pump 21 are (optionally) provided connected in parallel here. The electric pump 20 is in operation at least when the internal combustion engine 7 is switched off and the mechanical pump 21 may be inseparably connected to the ICE shaft 8.

Optionally, a further electric machine is also provided (not shown), for example on the input side of the belt-drive transmission 2, for example without an interposed disconnect clutch, and/or in a separate drivetrain, for example on the rear axle 43 or on the front axle 42 in engagement with the differential 47 or with the consumer connection 46.

The acceleration method proposed here allows rapid acceleration of a hybrid drivetrain with the efficient use of the powertrain without high power consumption.

REFERENCE NUMERALS

1 Hybrid drivetrain
2 Belt-drive transmission
3 Transmission input shaft
4 Transmission output shaft
5 Lower transmission ratio
6 Upper transmission ratio
7 Internal combustion engine
8 ICE shaft
9 Electric machine
10 Rotor shaft
11 K0 clutch
12 Adjustment gradient
13 K2 clutch
14 System pressure source
15 System power 16 System pressure
17 Hydraulic volume flow
18 Maximum power limit value
19 Intermediate transmission ratio
20 Electric pump
21 Mechanical pump
22 Hybrid vehicle
23 Left drive wheel
24 Right drive wheel
25 Claw clutch
26 First partial clutch
27 Second partial clutch
28 Speed axis
29 Time axis
30 Speed curve
31 Transmission ratio axis
32 Lower half (overdrive)
33 Upper half (underdrive)
34 Transmission ratio curve
35 Adjustment gradient axis
36 Rotational speed axis
37 Rotor speed curve
38 Combustion engine speed curve
39 System pressure axis
40 Volume flow axis
41 Power axis
42 Front axle
43 Rear axle
44 Driver's cab
45 Longitudinal axis
46 Consumer connection
47 Differential
48 Input-side cone pulley pair
49 Output-side cone pulley pair
50 Belt drive
51 Partial powertrain

The invention claimed is:

1. An acceleration method for a hybrid drivetrain, comprising:
providing the hybrid drivetrain comprising:
a belt-drive transmission comprising:
a transmission input shaft;
a transmission output shaft; and
a belt for transmitting a torque between the transmission input shaft and the transmission output shaft with a torque transmission ratio that is variable between a lower transmission ratio and an upper transmission ratio, greater than the lower transmission ratio;
an internal combustion engine comprising an ICE shaft for outputting an engine torque to the transmission input shaft;
an electric machine comprising a rotor shaft for outputting an electric machine torque to the transmission input shaft; and
a first disconnect clutch arranged in a first torque path between the electric machine and the internal combustion engine;
setting an initial torque transmission ratio of the belt-drive transmission to the lower transmission ratio;
opening the first disconnect clutch to interrupt torque transmission between the internal combustion engine and the electric machine;
receiving an acceleration command;
shifting the torque transmission, ratio with a transmission adjustment gradient from the lower transmission ratio towards the upper transmission ratio;
increasing a rotor speed of the rotor shaft with a rotor shaft adjustment gradient; and
engaging the first disconnect clutch to rotate the ICE shaft to start the internal combustion engine and increase a rotational speed of the ICE shaft towards a current rotor speed.

2. The acceleration method of claim 1 wherein:
the hybrid drivetrain further comprises a second disconnect clutch arranged in a second torque path between the electric machine and the belt-drive transmission; and
the method further comprises actuating the second disconnect clutch in accordance with the torque.

3. The acceleration method of claim 1 wherein:
the hybrid drivetrain further comprises an adaptive system pressure source;
the belt-drive transmission and the first disconnect clutch are hydraulically fed from the adaptive system pressure source; and
the method further comprises keeping a hydraulic system power sensed by the hybrid drivetrain as a product of a current system pressure and a current hydraulic volume flow of the adaptive system pressure source below a predetermined maximum power limit value.

4. The acceleration method of claim 3 wherein the step of shifting the lower transmission ratio with an adjustment gradient towards the upper transmission ratio and increasing a rotor speed of the rotor shaft is executed until the hydraulic system power reaches the predetermined maximum power limit value.

5. The acceleration method of claim 3 wherein:
the step of shifting the lower transmission ratio with an adjustment gradient towards the upper transmission ratio and increasing a rotor speed of the rotor shaft is executed in two sub-steps;
a first sub-step includes adjusting the adjustment gradient for a maximum hydraulic flow; and
a second sub-step includes adjusting the adjustment gradient for increased electric machine torque for increasing a system pressure of the adaptive system pressure source.

6. The acceleration method of claim 3 wherein, the step of engaging the first disconnect clutch to rotate the ICE shaft to start the internal combustion engine and increasing the rotational speed of the ICE shaft towards the current rotor speed further comprises:
shifting the torque transmission ratio towards the upper transmission ratio;
increasing the rotor speed; and
reducing the transmission adjustment gradient or the rotor shaft adjustment gradient.

7. The acceleration method of claim 3 wherein:
the hybrid drivetrain further comprises:
a first pump with an electric drive unit; and
a second pump driven by the internal combustion engine;
the first pump provides the hydraulic system power during the step of shifting the lower transmission ratio with a transmission adjustment gradient towards the upper transmission ratio and increasing a rotor speed of the rotor shaft with a rotor shaft adjustment gradient; and
the first pump and the second pump provide the hydraulic system power during the step of engaging the first disconnect clutch to rotate the ICE shaft to start the internal combustion engine and increasing the rotational speed of the ICE shaft towards the current rotor speed.

8. The acceleration method of claim 1 wherein the acceleration method is immediately aborted if the acceleration command is aborted.

9. The acceleration method of claim 1 wherein the torque transmission ratio is shifted towards the lower transmission ratio if the acceleration command is aborted.

10. The acceleration method of claim 1 wherein the first disconnect clutch is engaged and rotational energy of the ICE shaft is transmitted to the belt-drive transmission if the acceleration command is aborted during the step of engaging the first disconnect clutch to rotate the ICE shaft to start the internal combustion engine and increasing the rotational speed of the ICE shaft towards the current rotor speed.

11. The hybrid drivetrain of claim 1 configured to execute the method of claim 1.

12. The hybrid drivetrain of claim 11 further comprising a second disconnect clutch arranged in a second torque path between the electric machine and the belt-drive transmission.

13. A hybrid vehicle comprising:
a drive wheel; and
the hybrid drivetrain of claim 11 arranged to transmit the torque to the drive wheel.

14. The hybrid vehicle of claim 13 wherein:
the hybrid drivetrain further comprises a second disconnect clutch comprising a first partial clutch and a second partial clutch;
the first partial clutch is arranged in a second torque path between the electric machine and the transmission input shaft; and
the second partial clutch is arranged in a third torque path directly connecting the electric machine to the drive wheel.

15. The hybrid vehicle of claim 13 further comprising a third disconnect clutch arranged in a fourth torque path between the transmission output shaft and the drive wheel.

* * * * *